US012338843B2

(12) United States Patent
Whitney et al.

(10) Patent No.: US 12,338,843 B2
(45) Date of Patent: Jun. 24, 2025

(54) HYDRAULIC THRUSTER

(71) Applicant: Coretrax Americas Ltd., Houston, TX (US)

(72) Inventors: Tyler Whitney, Houston, TX (US); Alessandro Caccialupi, Houston, TX (US); Scott Benzie, Houston, TX (US)

(73) Assignee: Coretrax Americas Ltd., Houston, TX (US)

( * ) Notice: Subject to any disclaimer, the term of this patent is extended or adjusted under 35 U.S.C. 154(b) by 0 days.

(21) Appl. No.: 17/922,458

(22) PCT Filed: Jul. 15, 2021

(86) PCT No.: PCT/US2021/041905
§ 371 (c)(1),
(2) Date: Oct. 31, 2022

(87) PCT Pub. No.: WO2022/016023
PCT Pub. Date: Jan. 20, 2022

(65) Prior Publication Data

US 2023/0167835 A1 Jun. 1, 2023

Related U.S. Application Data

(63) Continuation of application No. 17/377,344, filed on Jul. 15, 2021, now Pat. No. 11,441,583.
(Continued)

(51) Int. Cl.
*F15B 15/14* (2006.01)
*F15B 11/20* (2006.01)

(52) U.S. Cl.
CPC .......... *F15B 15/1404* (2013.01); *F15B 11/20* (2013.01)

(58) Field of Classification Search
CPC .............. E21B 23/0412; F15B 15/1404; F15B 15/1457; F15B 15/149
See application file for complete search history.

(56) References Cited

U.S. PATENT DOCUMENTS 3,712,376 A 1/1973 Owen et al.
3,948,321 A 4/1976 Owen et al.
(Continued)

FOREIGN PATENT DOCUMENTS

CN 205382907 7/2016
CN 106246099 12/2016
WO 03054342 7/2003

OTHER PUBLICATIONS

International Search Report and Written Opinion for Application No. PCT/US2021/041905 dated Jan. 3, 2022.
(Continued)

*Primary Examiner* — Abiy Teka
(74) *Attorney, Agent, or Firm* — Patterson + Sheridan, LLP

(57) ABSTRACT

A hydraulic thruster system for providing an axial force. In one embodiment, the system comprises a pump, a motor for driving the pump, and a hydraulic thruster comprising: a cylinder comprising a plurality of cylinder pistons; a shaft comprising a plurality of shaft pistons; a plurality of first pressure chambers; and a plurality of second pressure chambers, wherein the plurality of shaft pistons are positioned inside the cylinder, between the cylinder pistons to form the plurality of first and a second pressure chambers, wherein the shaft further comprises a first fluid passage connected to the pump and to the first pressure chambers, and a second fluid passage connected to the pump and to the second pressure chambers, and wherein the pump may pump fluid into the first pressure chambers and suction fluid from the
(Continued)

second pressure chambers providing an axial force between the shaft and the cylinder.

18 Claims, 2 Drawing Sheets

Related U.S. Application Data

(60) Provisional application No. 63/052,285, filed on Jul. 15, 2020.

(56) References Cited

U.S. PATENT DOCUMENTS

| | | | | |
|---|---|---|---|---|
| 4,009,753 | A | 3/1977 | McGill et al. | |
| 4,325,434 | A | 4/1982 | Roberts | |
| 6,543,223 | B2 * | 4/2003 | Muschong | B25B 5/122 91/454 |
| 6,769,350 | B2 * | 8/2004 | Hoogen | F15B 15/1471 92/152 |
| 8,141,634 | B2 | 3/2012 | Fisher et al. | |
| 8,448,432 | B2 * | 5/2013 | Bresie | F15B 7/006 92/113 |
| 10,066,447 | B2 | 9/2018 | Thomas | |
| 11,441,583 | B2 * | 9/2022 | Whitney | E21B 23/042 |
| 2008/0041597 | A1 | 2/2008 | Fisher et al. | |
| 2010/0319930 | A1 | 12/2010 | Evans | |
| 2012/0090849 | A1 | 4/2012 | Stanford | |
| 2013/0309016 | A1 | 11/2013 | McKee et al. | |
| 2014/0110129 | A1 | 4/2014 | Schmidt | |
| 2015/0136394 | A1 | 5/2015 | Turley et al. | |
| 2015/0218906 | A1 | 8/2015 | Clem et al. | |
| 2016/0362967 | A1 | 12/2016 | Mullins | |
| 2017/0275962 | A1 | 9/2017 | Conzemius et al. | |
| 2020/0024918 | A1 * | 1/2020 | Al Hussin | E21B 34/06 |
| 2020/0088009 | A1 | 3/2020 | Cui | |

OTHER PUBLICATIONS

USPTO Notice of Allowance for U.S. Appl. No. 17/377,344 dated May 10, 2022.

USPTO Non-Final Office Action for U.S. Appl. No. 17/377,344 dated Dec. 14, 2021.

USPTO Non-Final Office Action for U.S. Appl. No. 17/376,094 dated Aug. 8, 2022.

International Preliminary Report on Patentability for Application No. PCT/US2021/041905 dated Jan. 26, 2023.

International Preliminary Report on Patentability for Application No. PCT/US2021/041702 dated Jan. 26, 2023.

* cited by examiner

HYDRAULIC THRUSTER

CROSS-REFERENCE TO RELATED APPLICATIONS

This application is a U.S. National Entry of PCT Application Serial No. PCT/US2021/041905 filed Jul. 15, 2021, which claims the benefit of U.S. patent application Ser. No. 17/377,344 filed Jul. 15, 2021 and issued as U.S. Pat. No. 11,441,583 on Sep. 13, 2022, and U.S. Provisional Application Ser. No. 63/052,285 filed Jul. 15, 2020, the disclosures of which are each incorporated by reference herein in their entirety.

STATEMENT REGARDING FEDERALLY SPONSORED RESEARCH OR DEVELOPMENT

Not applicable.

BACKGROUND OF THE INVENTION

Field of the Invention

The present invention relates to a hydraulic thruster system for use in an oil and/or gas well that may be capable of providing a force in the axial direction for a tool when deployed downhole. More particularly, the present invention relates to, without limitation, a hydraulic thruster system suitable for use with an expansion system that requires a force in the axial direction to expand a liner or cladding inside casing of an oil and/or gas well to eliminate casing leaks.

Background of the Invention

Various systems and methods have been proposed and utilized for providing a force in the axial direction for a tool deployed downhole, particularly during well operations involving liner or cladding expansion, including some of the systems and methods in the references appearing on the face of this patent. However, those systems and methods lack all the features or steps of the systems and methods covered by any patent claims below. For instance, known hydraulic thruster systems, when used on a wireline, typically comprise a container for housing hydraulic fluid that extends the entire length of a downhole assembly, which may often be unacceptable for rig operations.

As will be apparent to a person of ordinary skill in the art, any systems and methods covered by claims of the issued patent solve many of the problems that prior art systems and methods have failed to solve, particularly by providing a hydraulic thruster system that does not require a hydraulic fluid container. Also, the systems and methods covered by at least some of the claims of this patent have benefits that could be surprising and unexpected to a person of ordinary skill in the art based on the prior art existing at the time of invention.

BRIEF SUMMARY OF SOME OF THE PREFERRED EMBODIMENTS

These and other needs in the art are addressed in one embodiment by a hydraulic thruster system for providing an axial force comprising a pump, a motor for driving the pump, and a hydraulic thruster comprising: a cylinder comprising a plurality of cylinder pistons; a shaft comprising a plurality of shaft pistons; a plurality of first pressure chambers; and a plurality of second pressure chambers, wherein the plurality of shaft pistons are positioned inside the cylinder, between the cylinder pistons to form the plurality of first and a second pressure chambers, wherein the shaft further comprises a first fluid passage connected to the pump and to the first pressure chambers, and a second fluid passage connected to the pump and to the second pressure chambers, and wherein the pump may pump fluid into the first pressure chambers and suction fluid from the second pressure chambers providing an axial force between the shaft and the cylinder.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments. In the following description of the representative embodiments of the invention, directional terms, such as “above,” “below,” “upper,” “lower,” etc., are used for convenience in referring to the accompanying drawings. In general, “above,” “upper,” “upward” and similar terms refer to a direction towards the earth’s surface along a wellbore, and “below,” “lower,” “downward” and similar terms refer to a direction away from the earth’s surface along the wellbore.

Figure 1:
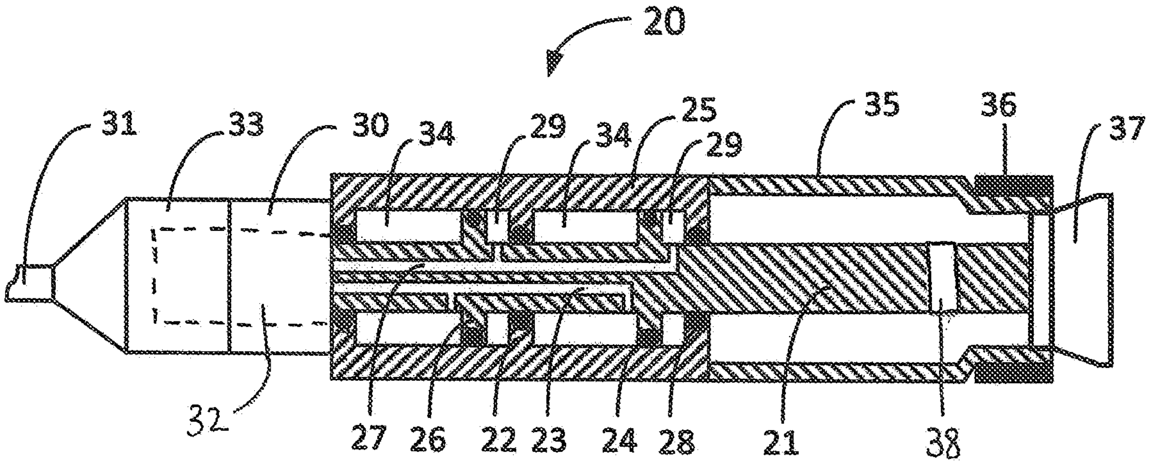
FIG. 1 illustrates a longitudinal, cross-sectional view of a hydraulic thruster system that is coupled to an expansion system in a pre-expansion position according to an embodiment of the present invention.
Figure 2:
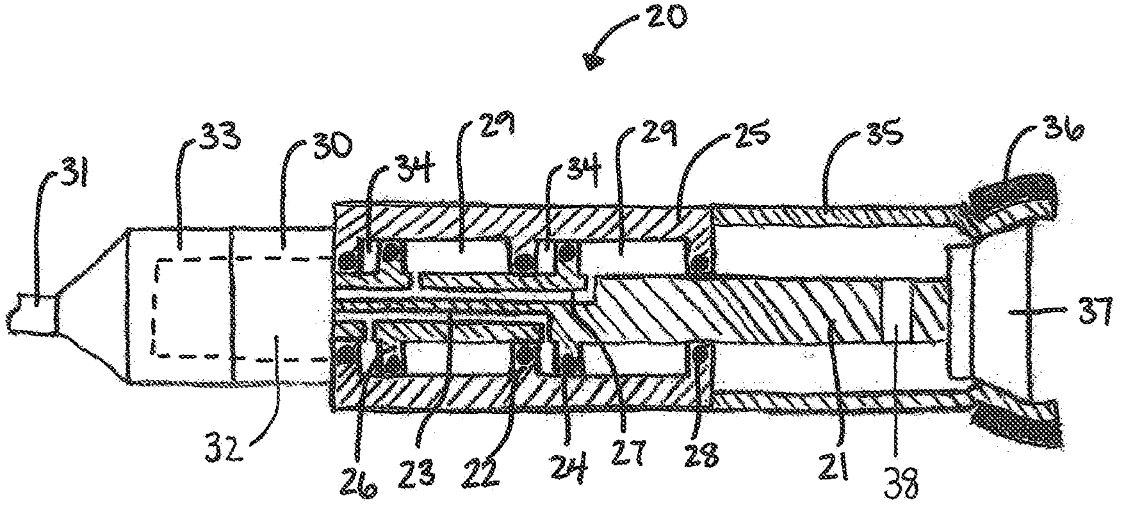
FIG. 2 illustrates a longitudinal, cross-sectional view of a hydraulic thruster system that is coupled to an expansion system in a partial-expansion position according to an embodiment of the present invention.

FIGS. 1 and 2 illustrate an embodiment of a hydraulic thruster system. In embodiments, a hydraulic thruster system may comprise three major components: a hydraulic thruster 20, a high-pressure pump 30, and a motor 33. These components may be disposed on a wireline 31, or the like, such that high-pressure pump 30 may be below motor 33 and hydraulic thruster 20 may be below high-pressure pump 30. Further, the hydraulic thruster system may be coupled to any suitable tool assembly. When deployed downhole, the hydraulic thruster system may be capable of providing an axial force on the tool assembly to which it may be coupled. Although the hydraulic thruster system may be coupled to any suitable downhole tool assembly, FIGS. 1 and 2 illustrate an embodiment in which the hydraulic thruster system may be coupled to an expansion system. In embodiments, the expansion system may comprise an expansion device 37, a patch 35, and an anchor/sealing element 36, wherein anchor/sealing element 36 may be disposed on an outer surface of patch 35. Further, the expansion system may be coupled below the hydraulic thruster system.

In embodiments, hydraulic thruster 20 may comprise a cylinder 25, a shaft 21, a plurality of first pressure chambers 29, and a plurality of second pressure chamber 34. Cylinder 25 may be an enclosure radially disposed about a portion of shaft 21. In embodiments, cylinder 25 may comprise a plurality of cylinder-pistons 22, which may be a set of any number of protrusions disposed on an inner surface of cylinder 25. Cylinder-pistons 22 may be in contact with an outer surface of shaft 21 thereby creating a plurality of spaces radially between cylinder 25 and shaft 21. In addition to cylinder-pistons 22, shaft 21 may comprise a plurality of shaft-pistons 26, which may also be set of any number of protrusions, but disposed on the outer surface of shaft 21. In embodiments, shaft-pistons 26 may be in contact with the inner surface of cylinder 25 and disposed between cylinder-pistons 22. As such, each of the plurality of spaces created radially between cylinder 25 and shaft 21 may be divided into two, thus creating plurality of first pressure chambers 29 and plurality second pressure chambers 34. In embodiments, each pressure chamber 29 and 34 may comprise a pressure tight seal, accomplished via cylinder-piston sealing elements 28 and shaft-piston sealing elements 24. Cylinder-piston sealing elements 28 may be disposed radially between cylinder-pistons 22 and the outer surface of shaft 21, while shaft-piston sealing elements 24 may be disposed radially between shaft-pistons 26 and the inner surface of cylinder 25.

As further illustrated in FIGS. 1 and 2, the volumes of the plurality of first and second pressure chambers 29 and 34 may be manipulated to axially displace shaft 21. In embodiments, shaft 21 may comprise a first fluid passage 27 and a second fluid passage 23. First fluid passage 27 may be a borehole disposed within shaft 21 which travels from high pressure pump 30 to the plurality of first pressure chambers 29. Second fluid passage 23 may be an alternative borehole disposed within shaft 21 which travels from high pressure pump 30 to the plurality of second pressure chambers 29. In use, pump 30, which may be driven by the motor 33, may pump a fluid through first fluid passage 27 and into first pressure chambers 29, while simultaneously suctioning a corresponding amount of fluid through second fluid passage 23 from adjacent second pressure chambers 34. Therefore, in embodiments, shaft-pistons 26 and, consequently, shaft 21 may be axially displaced relative to cylinder 25, and thus may provide an axial force. In some embodiments, as illustrated in FIGS. 1 and 2, hydraulic thruster 20 may comprise a shaft 21 comprising two shaft-pistons 26. In such embodiments, the axial force may be equal to the product of pressure applied in first pressure chambers 29 times the area of the shaft-pistons 26. In alternative embodiments, the hydraulic thruster may have one or multiple number of shaft-pistons 26 to provide any necessary axial force.

As previously disclosed, the hydraulic thruster system may be coupled to an expansion system, wherein the expansion system comprises expansion device 37, patch 35, and anchor/sealing element 36. In particular, shaft 21 of the hydraulic thruster system may be coupled to expansion device 37 of the expansion system. As illustrated in FIG. 1, patch 35 may be disposed, initially, below cylinder 25, above expansion device 37, and radially about shaft 21. However, when shaft 21 experiences the axial force and undergoes axial displacement in the upward direction, expansion device 37 may also be axially displaced in an upward direction. When this occurs, as illustrated in FIG. 2, expander device 37 may be pulled within patch 35, thereby causing the patch and anchor/sealing element 36 to expand radially. Further, an upper portion of shaft 21 may be displaced into a recess 32 within high pressure pump 30 and/or motor 33. In embodiments, expansion device 37 may be displaced in an upward direction until it may be in contact with cylinder 25, thus allowing for full expansion of patch 35 and anchor/sealing element 36.

In some embodiments, shaft 21 may further comprise a disconnect device 38 positioned on a portion of the shaft not enclosed within cylinder 25. Disconnect device 38 may allow the hydraulic thruster system to be easily detached from the expansion system, particularly in the case of failure in either of the systems downhole. In such embodiments, any suitable disconnect device may be used. For instance, the disconnect device as disclosed in U.S. patent application Ser. No. 17/376,094, the disclosure of which is incorporated herein by reference, may be configured for used with shaft 21. Such a configuration, may require the addition of a third fluid passage (not illustrated) within shaft 21, in order to provide any necessary fluid to disconnect device 38 in order to actuate.

In an alternative embodiment, the fluid flow may be reversed by pumping the fluid through second fluid passage 23 into second pressure chambers 34, while simultaneously suctioning a corresponding amount of fluid through first fluid passage 27 from first pressure chambers 29. In such embodiments, this may produce axial force in a downward direction, the direction opposite to that described above. Further, this may allow for the hydraulic thruster system to be simply reset.

Figure 3:
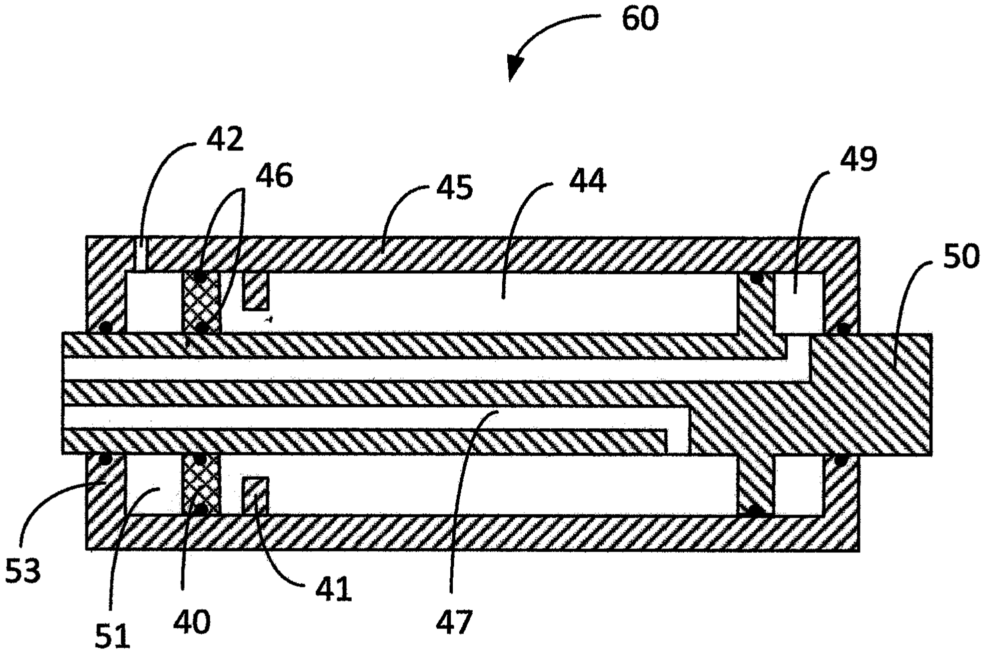
FIG. 3 illustrates a partial longitudinal, cross-sectional view of a hydraulic thruster according to an alternative embodiment of the present invention.

In an alternative embodiment of the present invention, the hydraulic thruster system may comprise a hydraulic thruster 60 instead of hydraulic thruster 20. As illustrated in FIG. 3, hydraulic thruster 60 may comprise a pressure compensation system. In embodiments, hydraulic thruster 60 may comprise a compensation piston 40 providing pressure equalization due to the temperature and/or hydrostatic pressure changes in an oil and/or gas well. Compensation piston 40 may be slidably connected to a shaft 50 and to a cylinder 45. In embodiments, cylinder 45 may comprise a vent opening 42, which may be capable of providing pressure communication between a chamber 51 and an exterior of hydraulic thruster 60. Further, cylinder 45 may comprise a stoper 41 solidly connected to its inner surface. In embodiments, stoper 41 may be positioned at a distance from an end-cup 53 of cylinder 25, such that the volume of chamber 51, between end-cup 53 and compensation piston 40, when positioned at stoper 41, may not be less than the maximum expected volume change of the pressure liquid in chambers 44 and 49 due to temperature and/or hydrostatic pressure changes. In further embodiments, compensation piston 40 may comprise hydraulic seals 46, positioned such that when compensation piston 40 may be located at end-cup 53, chamber 44 may be hydraulically sealed and pressure liquid from chamber 44 may not flow out through vent opening 42, providing that it flows through the return line 47.

In the embodiments described above, the fluid system may be a closed recirculation system which does not require an external container and thereby may be capable of minimizing the length of the hydraulic thruster system. Further, the described recirculation system does not require use of mud as an operational fluid, which may eliminate the possibility of pistons becoming stuck due to dirt in the mud.

It should be understood that the drawings and description thereto are not intended to limit the disclosure to the particular form disclosed, but on the contrary, the intention is to cover all modifications, equivalents and alternatives falling within the spirit and scope of the present disclosure.

What is claimed is:

1. An expansion system for expanding a casing patch inside a casing of an oil or gas well, comprising:
- a motor;
- a pump, wherein the pump is driven by the motor;
- a hydraulic thruster comprising:
  - a cylinder comprising a plurality of cylinder pistons,
  - a shaft comprising a plurality of shaft pistons,
  - a plurality of first pressure chambers,
  - a plurality of second pressure chambers, and
  - a fluid disposed within the plurality of first pressure chambers, within the plurality of second pressure chambers, or partially within both the plurality of first pressure chambers and the plurality of second pressure chambers, wherein the plurality of shaft pistons are disposed within the cylinder, between the plurality of cylinder pistons to form the plurality of first and second pressure chambers;
- an expansion device coupled to the shaft; and
- a casing patch, wherein the expansion device is in communication with the casing patch; wherein upon axial manipulation of the shaft via circulation of the fluid by the pump, the expansion device is displaced in a direction which causes the expansion device to radially expand the patch.

2. The expansion system of claim 1, wherein the shaft further comprises a fluid passage connecting the plurality of first pressure chambers to the plurality of second pressure chambers.

3. The expansion system of claim 1, wherein the pump or the pump and motor comprise a recess in which to receive the shaft upon the axial manipulation.

4. The expansion system of claim 1, wherein the expansion system is disposed on a wireline.

5. The expansion system of claim 1, wherein the shaft further comprises a disconnect device.

6. The expansion system of claim 1, wherein the fluid is suctioned from the plurality of second pressure chambers and pumped into the plurality of first pressure chambers via the pump.

7. An expansion system for expanding a casing patch inside a casing of an oil or gas well, comprising:
- a motor;
- a pump, wherein the pump is driven by the motor;
- a hydraulic thruster comprising:
  - a cylinder comprising two cylinder pistons,
  - a shaft comprising a shaft piston,
  - a first pressure chamber, a second pressure chamber, and
  - a fluid disposed within the first pressure chamber, within the second pressure chamber, of partially within both the first pressure chamber and the second pressure chamber, wherein the shaft piston is disposed within the cylinder, between the two of cylinder pistons to form the first and second pressure chambers;
- an expansion device coupled to the shaft; and a casing patch, wherein the expansion device is in communication with the casing patch; wherein upon axial manipulation of the shaft via circulation of the fluid by the pump, the expansion device is displaced in a direction which causes the expansion device to radially expand the patch.

8. The expansion system of claim 7, wherein the shaft further comprises a fluid passage connecting the first pressure chamber to the second pressure chamber.

9. The expansion system of claim 7, wherein the pump or the pump and motor comprise a recess in which to receive the shaft upon the axial manipulation.

10. The expansion system of claim 7, wherein the expansion system is disposed on a wireline.

11. The expansion system of claim 7, wherein the shaft further comprises a disconnect device.

12. The expansion system of claim 7, wherein the fluid is suctioned from the second pressure chamber and pumped into the first pressure chamber via the pump.

13. A method of expanding a patch inside a casing of an oil or gas well, comprising:
- (A) providing an expansion tool assembly by coupling a hydraulic thruster system comprising a motor, a pump, and a hydraulic thruster to an expansion system comprising an expansion device and a patch, wherein a shaft disposed within the hydraulic thruster is connected to the expansion device;
- (B) deploying the expansion tool assembly into an oil or gas well;
- (C) pumping a fluid from at least one first pressure chamber disposed within the hydraulic thruster into at least one second pressure chamber disposed within the hydraulic thruster via the pump and motor, wherein the fluid passes through a first and second fluid passage disposed within the shaft;
- (D) allowing the transfer of fluid to axially displace the shaft and the expansion device to which the shaft is connected;
- (E) expanding the patch radially inside a casing of the oil or gas well as a result of the axial displacement of the shaft.

14. The method of claim 13, wherein the deploying comprises disposing the expansion tool assembly into the oil or gas well via a wireline.

15. The method of claim 13, wherein the at least one first pressure chamber and the at least one second pressure chamber are formed between a cylinder and the shaft of the hydraulic thruster via at least one cylinder piston disposed on an inner surface of the cylinder, and at least one shaft piston disposed on an outer surface of the shaft.

16. The method of claim 15, wherein the at least one first pressure chamber and the at least one second pressure chamber comprise pressure tight seals accomplished via at least one cylinder-piston sealing element respectively disposed between the at least one cylinder piston and the outer surface of the shaft, and at least one shaft-piston sealing element respectively disposed between the at least one shaft piston and the inner surface of the cylinder.

17. The method of claim 13, wherein the shaft further comprises a disconnect device.

18. The method of claim 13, wherein the pump or the pump and motor comprise a recess in which to receive the shaft upon the axial displacement of the shaft.

* * * * *